US010805791B2

(12) United States Patent
Synal et al.

(10) Patent No.: US 10,805,791 B2
(45) Date of Patent: Oct. 13, 2020

(54) MSISDN SHARING BETWEEN UES AND PBX DEVICES

(71) Applicant: T-Mobile USA, Inc., Bellevue, WA (US)

(72) Inventors: Adrian T. Synal, Kirkland, WA (US); Michele Kinsey, Shoreline, WA (US); Shelby Seward, Bellevue, WA (US); Vinod Ravichandran, Renton, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 16/353,789

(22) Filed: Mar. 14, 2019

(65) Prior Publication Data

US 2020/0296578 A1  Sep. 17, 2020

(51) Int. Cl.
*H04W 4/00* (2018.01)
*H04W 8/28* (2009.01)
*H04W 8/18* (2009.01)
*H04L 29/06* (2006.01)

(52) U.S. Cl.
CPC .......... *H04W 8/28* (2013.01); *H04W 8/18* (2013.01); *H04L 65/1056* (2013.01)

(58) Field of Classification Search
USPC .......... 455/418, 435.1, 411; 379/45, 221.01; 370/328
See application file for complete search history.

(56) References Cited

U.S. PATENT DOCUMENTS

| 10,375,563 | B1* | 8/2019 | Bellam | H04W 12/08 |
| 2010/0002626 | A1* | 1/2010 | Schmidt | H04W 88/085 370/328 |
| 2010/0329443 | A1* | 12/2010 | Montaner Gutierrez | H04W 84/16 379/221.01 |
| 2012/0220281 | A1* | 8/2012 | Chandan | H04W 8/26 455/418 |
| 2012/0252424 | A1* | 10/2012 | Cormier | H04W 12/06 455/418 |
| 2013/0316677 | A1* | 11/2013 | Aharon | H04M 3/5231 455/411 |
| 2015/0156321 | A1* | 6/2015 | Abnett | G06F 16/2455 379/45 |

* cited by examiner

*Primary Examiner* — David Q Nguyen
(74) *Attorney, Agent, or Firm* — Lee & Hayes, P.C.

(57) ABSTRACT

A telecommunication network provides telecommunication service to a user equipment (UE) and a communication device that is connected to the telecommunication network via a private branch exchange. Both the UE and the communication device utilizing a Mobile Station International Subscriber Directory Number (MSISDN) for the telecommunication service, and the telecommunication network stores a profile associating both the UE and the communication device with the MSISDN. Additionally, the telecommunication network enables communication between the communication device and a communication partner device and notifies the UE of the communication.

20 Claims, 5 Drawing Sheets

MSISDN SHARING BETWEEN UES AND PBX DEVICES

BACKGROUND

A Private Branch Exchange (PBX) is a private communication network in which multiple communication devices may share a single outward-facing identifier, such as a common number. Such a common number, referred to as an auto-attendant phone number (AA number), may be a telephone number such as a Mobile Station International Subscriber Directory Number (MSISDN) and may appear as a source of outgoing video calls or voice calls. Calls to the communication devices of the PBX may be to that common number or to separate direct inward dial (DID) numbers that are specific to each communication device of the PBX.

PBXs are often used by businesses or other group entities to conduct business or other group communications. Personnel of the business or group may each be assigned a communication device with one of the separate DID numbers. Because of the global scale of business and much other human activity, those personnel will also travel and need to communicate without connection through the PBX. For such communications, the personnel will typically carry a user equipment (UE), often referred to as a cellular phone. The UE will also have a MSISDN, also known as a mobile number, thus requiring the personnel to maintain at least two different identities for business or group communications.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

Various implementations described herein include a telecommunication network that provides telecommunication service to a UE and to a communication device that is connected to the telecommunication network via a PBX. Both the UE and the communication device utilize a same MSISDN for the telecommunication service, and the telecommunication network stores a profile associating both the UE and the communication device with the MSISDN. Additionally, the telecommunication network enables communication between the communication device and a communication partner device and notifies the UE of the communication.

Figure 1:
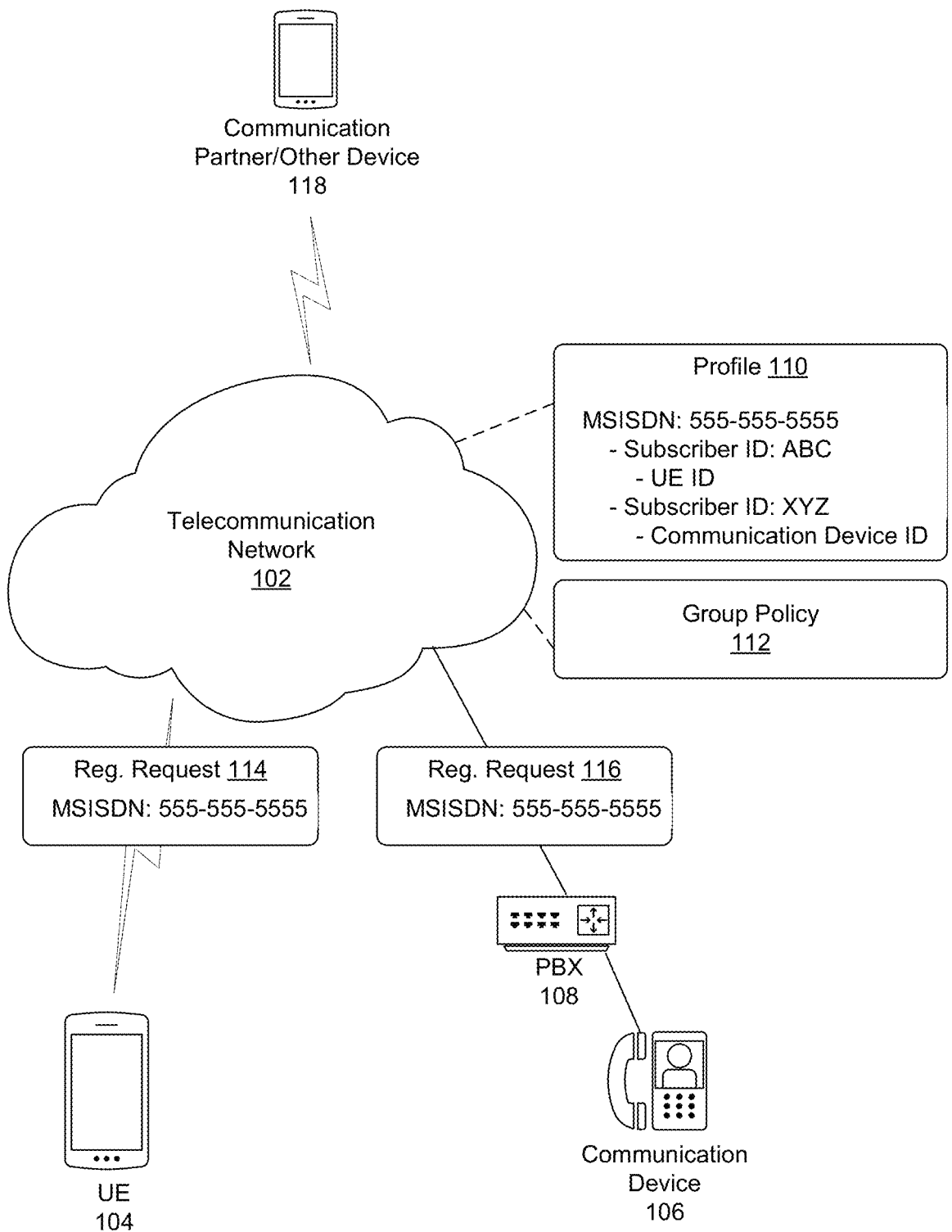
FIG. 1 illustrates an example overview of a telecommunication network that enables both a communication device of a PBX and a UE to use a same MSISDN for telecommunication service.

FIG. 1 illustrates an example overview of a telecommunication network 102 that enables both a UE 104 and a communication device 106 of a PBX 108 to use a same MSISDN for telecommunication service. The telecommunication network 102 may reference a profile 110 which associates MSISDNs with subscriber identifiers and device identifiers, as well as a group policy 112, in deciding whether to provide telecommunication services to each of the UE 104 and communication device 106 in response to respective registration requests 114 and 116. When telecommunication service is provided, the telecommunication network 102 may enable the UE 104 or the communication device 106 to communicate with a communication partner device 118 (also referred to herein as an "other device 118"). When the telecommunication network 102 enables a communication via the MSISDN between the communication device 106 and the communication partner device 118, the telecommunication network may notify the UE 104 of the communication, and visa-versa.

Figure 2:
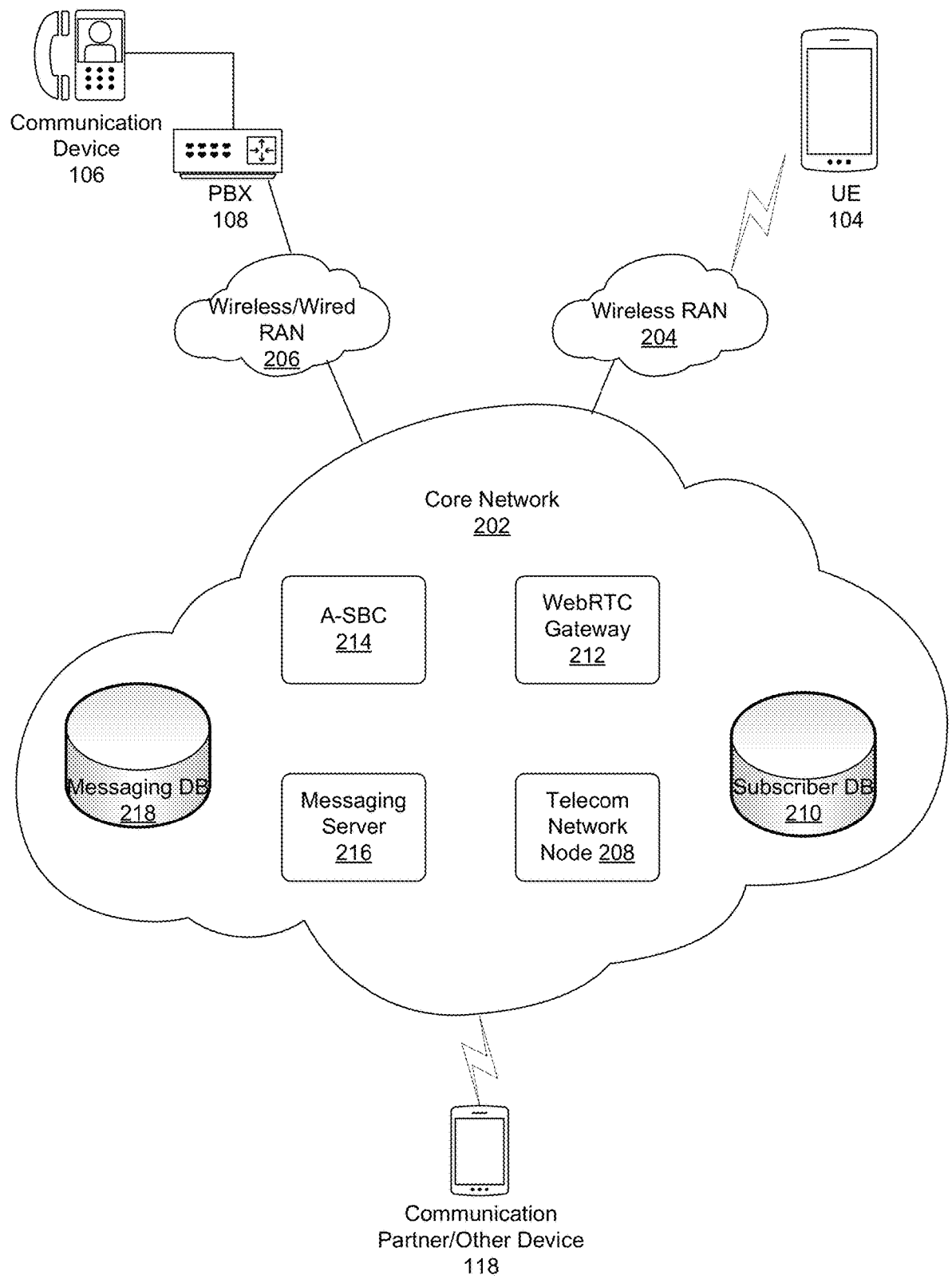
FIG. 2 illustrates an example network environment including a UE, a PBX, and nodes of a telecommunication network providing telecommunication service to the UE and PBX.

The telecommunication network 102 may be any sort of telecommunication network, such as a cellular network comprised of access networks and a core network. Example access networks may utilize any Third Generation Partnership Project (3GPP) Standard 3G, 4G, 5G, etc. technology or other 3G, 4G, 5G, etc. technology. Alternatively or additionally, example access networks may include unlicensed wireless networks, such as WiFi® or WiMax® networks, and/or wired access networks. An example core network may be a packet-based network and may support legacy, circuit-switched connections. The core network may also include 3GPP Internet Protocol (IP) Multimedia Subsystem (IMS) technology in support of packet-based communications. Such 3GPP IMS technology may support communications made using the Session Initiation Protocol (SIP). An example telecommunication network 102 is illustrated in FIG. 2 and is described below in detail with reference to that figure.

The UE 104 may be any sort of wireless communication device, such as a cellular handset, a tablet computer, a personal computer, a desktop computing device, a media player, etc. The UE 104 may include a radio for wireless communication and/or wired port(s), may include both input and output components, and may have a Subscriber Identity Module (SIM) or other technology that securely stores identity information for the UE 104. Further, the UE 104 may include a browser, a Web Real-Time Communication (WebRTC) client, a SIP client, etc. to support communications via the telecommunication network 102.

In various implementations, the communication device 106 may be any sort of device capable of engaging in a voice call, a video call, a messaging session, a chat session, or an email exchange. The communication device 106 may also be connected to the telecommunication network 102 via a PBX 108 for sending and receiving messages through the PBX 108. The communication device 106 may also be configured with a SIP client to enable communication with the telecommunication network 102 and may include a radio for wireless communication and/or wired port(s). Additionally, the communication device 106 may include both input and output components. An example communication device 106 may be a cellular handset, a tablet computer, a personal computer, a desktop computing device, a conference room device, a desk phone, a videoconference system, a media player, etc.

In some implementations, the PBX 108 may be any sort of private branch exchange—any sort of private network for which member devices share an outward facing identifier such as a common MSISDN (also referred to herein as a common number or AA number) while each have a different MSISDN (also referred to herein as a DID number) within the private network that may or may not be reachable by devices initiating communication from outside the private network. For example, PBX 108 may be associated with 555-555-5000 as a common number/AA number and communication device 106 may have 555-555-5555 as its MSISDN/DID number. Calls originating from communication device 106 may appear to a communication partner device 118 to originate from the common number of the PBX 108 rather than from the MSISDN of the communication device 106. In returning a missed call, though, the user of the communication partner device 118 may dial the MSISDN of the communication device 106 if it is known to that user. In some implementations, the PBX 108 functionality may also be located within the mobile operator as a virtual deployment and the communication devices 106 connects to that virtual deployment.

The profile 110 may be any sort of data received or retrieved from with the telecommunication network 102 or from outside of the telecommunication network 102. The profile 110 may be indexed by MSISDN, by device identifier, by subscriber identifier, or by some other index. For example, each MSISDN may be associated with one or more subscriber identifiers (e.g., International Mobile Subscriber Identifiers (IMSIs)) and each subscriber identifier with one or more device identifiers (e.g., International Mobile Equipment Identifiers (IMEIs)) and/or one or more unique user identifiers (UUIDs). When the UE 104 and communication device 106 are associated with different subscriber identifiers (e.g., with an individual and with an employer of that individual), the MSISDN shared by the UE 104 and communication device 106 may be associated with both subscriber identifiers. Each subscriber identifier may, in turn, be associated with one or more device identifiers (e.g., the device identifiers of the UE 104 and communication device 106, respectively) and/or UUIDs.

In various implementations, the group policy 112 may specify a list of device identifiers, UUIDs, and/or subscriber identifiers that are permitted to utilize a MSISDN of a group or entity associated with the PBX 108 and communication device 106. For example, the group policy 112 may specify the MSISDN of communication device 106 and may list the device identifier/UUID of the UE 104 as being permitted to use the MSISDN. Each group policy 112 may be specific to a group or entity and list any or all of the MSISDNs associated with that group or entity.

In some implementations, the communication partner device 118 (also referred to herein as other device 118) may be any sort of UE or communication device, such as a cellular handset, a tablet computer, a personal computer, a desktop computing device, a conference room device, a desk phone, a videoconference system, a media player, etc.

As shown in FIG. 1, the UE 104 may make a registration request 114 to the telecommunication network 102, and the communication device 106 may make a registration request 116 to the telecommunication network 102. In some implementations, both the registration request 114 and the registration request 116 are SIP REGISTER requests made by SIP clients of the UE 104 and communication device 106, respectively. In other implementations, the UE 104 and/or communication device 106 may utilize a browser or WebRTC client which uses Secure Hypertext Transfer Protocol (HTTPS) in making registration requests 114 or 116. In both implementations, whether using SIP or HTTPS, the registration requests 114 and 116 may each specify the MSISDN used by the UE 104 and communication device 106, respectively. In FIG. 1, that MSISDN is shared by the UE 104 and communication device 106 and thus the same MSISDN—555-555-5555—is included in the headers of both the registration requests 114 and 116.

If the registration request 114 or registration request 116 is received by the telecommunication network 102 in a form other than SIP (e.g., HTTPS), then a node of the telecommunication network 102 may act as a proxy SIP client, retrieving content from the HTTPS header and including it in a SIP header before sending the registration request 114 or registration request 116 as a SIP message onto other node(s) of the telecommunication network 102 for further processing.

Upon receiving registration request 114, the telecommunication network 102 may decide whether to grant or deny the registration request 114. The telecommunication network 102 may reference the profile 110 to determine if any of the subscriber identifiers associated with the MSISDN specified in the registration request 114 is associated with a group policy 112. If the MSISDN is associated with a group policy, the telecommunication network 102 determines whether the group policy 112 permits a subscriber identifier, UUID, or device identifier of the UE 104 to use the MSISDN. If the group policy 112 does not permit use, then the telecommunication network 102 denies the registration request 114. If no group policy 112 is applicable or if the group policy 112 permits use, then the telecommunication network 102 completes the registration and responds to the registration request 114 with an indication of success.

In further embodiments, in response to receiving the registration request 116, the telecommunication network 102 may reference the profile 110 and group policy 112 and grant or deny the registration request 116. The telecommunication network 102 may follow the same procedure used in handling the registration request 114 (described above) or may handle the registration request 116 differently. For example, the telecommunication network 102 may determine that the subscriber identifier included in the registration request 116 belongs to a group or entity associated with a group policy 112 and may assume that any registration requests 116 received from that group or entity are permitted. The telecommunication network 102 then completes the registration and responds to the registration request 116 with an indication of success.

In some implementations, the telecommunication network 102 may permit a user associated with a group or entity subscriber to add or modify a group policy 112. In addition to listing permitted subscriber identifiers, UUIDs, and/or device identifiers, the group policy 112 may also specify a common number for the PBX 108 so that any outgoing communication from communication device 106 or from other device(s) of the PBX 108 may appear as if originating from the common number.

In various implementations, a user of the UE 104 or communication device 106 may also select a subset of MSISDNs to utilize on the UE 104 or communication device 106. Such a selection may occur before, during, or after the registration request 114 or registration request 116. To select a subset of MSISDNs, a client of the UE 104 or communication device 106 may request a list of MSISDNs associated with the subscriber identifier of a user that is logged in to the UE 104 or communication device 106. The user may then select one or more of those MSISDNs and inform the telecommunication network 102 of the selection. The telecommunication network 102 may then update the profile 110 if a MSISDN is being used on a device that it had not previously been used for.

The UE 104 and communication device 106 may also each request notifications of any communications engaged in by the other and by any other device(s) using the shared MSISDN for communication. Such a request may take the form of a SIP subscribe request.

Following registration, the telecommunication network 102 may enable a communication between one of the UE 104 or communication device 106 with a communication partner device 118. Such a communication may be initiated by any of its parties and may take any form, such as voice calling, video calling, video conferencing, voice conferencing, text messaging, chat sessions, emails, etc. When the communication is initiated by a communication partner device 118, the telecommunication network 102 may offer one or more services, such as auto-attendant functionality, enabling line sharing, providing hunt group functionality, providing fax functionality, or providing extension calling functionality.

For example, the communication partner device 118 may initiate a voice call to the common number associated with the PBX 108 and the telecommunication network 102 may answer the voice call, acting as an auto-attendant and presenting the caller with a set of options. One such option may be to offer an opportunity to call an extension. Entry of the extension, if associated with the MSISDN, may result in ringing both the UE 104 and the communication device 106, either concurrently or, if hunt group functionality is offered, in an order specified by the hunt group.

When either the UE 104 or the communication device 106 initiates the communication, the telecommunication network 102 notifies the other of the UE 104 or the communication device 106 of the communication if the other of the UE 104 or the communication device 106 has requested notifications. Notifying the UE 104, for instance, may involve providing a notification through a browser or WebRTC client. Also, notification may include notifying of both communications to or from the MSISDN, but also for communications directed to the common number and an extension associated with the MSISDN.

When the communication device 106 initiates the communication, the telecommunication network 102 may reference the group policy 112 to determine if a common number is associated with the PBX 108. If a common number is associated with the PBX 108, the telecommunication network 102 may replace the MSISDN in a header field identifying the call originator with the common number.

In some implementations, the MSISDN shared by the UE 104 and communication device 106 is the common number (e.g., AA number) of the PBX 018 rather than the specific number (e.g., DID number) of the communication device 106. In such implementations, the UE 104 may be notified of any communication with any of the communication devices of the PBX 108.

Example Environment

FIG. 2 illustrates an example network environment including a UE, a PBX, and nodes of a telecommunication network providing telecommunication service to the UE and PBX. As illustrated, a telecommunication network, such as the telecommunication network 102 of FIG. 1, may include a core network 202 and one or more access networks, such as RANs. The wireless RAN 204 and wired or wireless RAN 206 may be examples of access networks of the telecommunication network, such as telecommunication network 102 or another telecommunication network. The core network 202 may include a telecommunication network node 208 and a subscriber database 210, as well as one or more gateway devices providing access to the core network 202. Such gateway devices may include a WebRTC gateway 212 and a A-SBC (Access—Session Border Controller) 214. Further, the core network may include other nodes, such as a messaging server 216 and messaging database 218. In some implementations, the PBX 108 may be part of the core network 202 or may serve as a RAN 204 or 206.

Examples of technologies for core network 202, wireless RAN 204, wired or wireless RAN 206 are described above with reference to telecommunication network 102 in FIG. 1. As noted, such technologies may include 3G, 4G, 5G, etc. for wireless 3GPP RANs, WiFi® or WiMax® for unlicensed wireless RANs, and IMS and packet-switched core network communications for core networks. Wired RAN technology for wired or wireless RAN 206 may include ethernet or other similar wired connections.

Within core network 202, the telecommunication network node 208 may be an application server, such as an IMS application server or Telephony Application Server (TAS) customized with additional logic to support the functionalities described herein. The telecommunication network node 208 may store the profile 110 and group policy 112 described in FIG. 1 or may retrieved the profile 110 and group policy 112 from another source, such as a home subscriber server (HSS) or customer/subscriber database (e.g., subscriber database 210). The telecommunication network node 208 may further perform the operations illustrated in FIGS. 4 and 5 and described further herein, as well as operations of the telecommunication network 102 described further herein.

The subscriber database 210 may be a relational database or any other sort of data store and may serve as an HSS or other database of core network 202. In addition to the profile 110 and group policy 112, the subscriber database 210 may store other subscriber records, such as home or work locations for a subscriber, other family members associated with a subscriber, or subscriber preferences, etc.

In various implementations, the WebRTC gateway 212 may receive communications from WebRTC clients or browsers on any of UE 104 or communication device 106. Such communications may be HTTPS communications, and the WebRTC gateway 212 may extract information from the HTTPS communications and form SIP messages with that extracted information. The SIP messages may then be delivered to destinations specified in the HTTPS communications and the SIP messages.

The A-SBC 214 may serve as a gateway device between an access network, such as wireless RAN 204 or wired or wireless RAN 2016, and the core network 202. Communications sent through the A-SBC 214 may be formed in accordance with the SIP protocol.

In some implementations, the messaging server 216 may be any sort of messaging server, such as a Short Messaging Service Center (SMSC) or a Multimedia Messaging Service Center (MMSC), to facilitate messaging between one of the UE 104 or communication device 106 and the communication partner device 118. The messaging store 218 may be any sort of database storing messages and, in further implementations, logs of other communications enabled by the telecommunication network node 208.

Example Architecture

Figure 3:
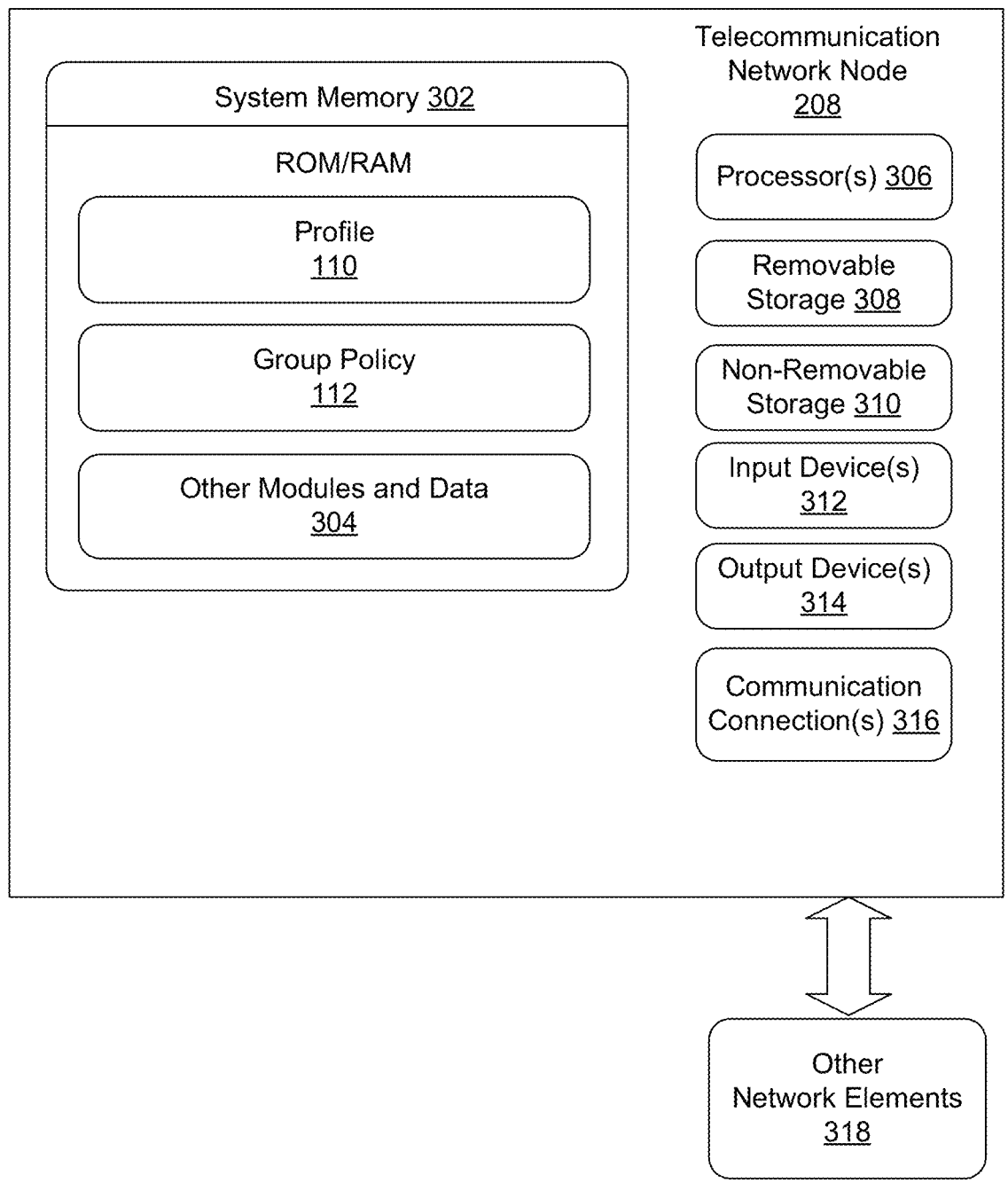
FIG. 3 illustrates an example architecture of a telecommunication network node.

FIG. 3 illustrates an example architecture of a telecommunication network node 208. The telecommunication network node 208 may be an example of a telecommunication network node 202, which is described further herein. A telecommunication network node 208 can have a system memory 302. The system memory 302 can store a profile 110, a group policy 112, and/or other modules and data 304. The telecommunication network node 208 can also include processor(s) 306, removable storage 308, non-removable storage 310, input device(s) 312, output device(s) 314, and/or communication connections 316 for communicating with other network elements 318.

In various examples, system memory 302 can be volatile (such as RAM), non-volatile (such as ROM, flash memory, etc.), or some combination of the two. Example system memory 302 can include one or more of RAM, ROM, EEPROM, a Flash Memory, a hard drive, a memory card, an optical storage, a magnetic cassette, a magnetic tape, a magnetic disk storage or another magnetic storage devices, or any other medium.

The profile 110 and group policy 112 are described above in detail with respect to FIGS. 1 and 2.

The other modules and data 304 can be utilized by the telecommunication network node 208 to perform or enable performing any action taken by the telecommunication network node 208. The other modules and data 304 can include a platform and applications, and data utilized by the platform and applications.

In some embodiments, the processor(s) 306 can be a central processing unit (CPU), a graphics processing unit (GPU), both CPU and GPU, or other processing unit or component known in the art.

The telecommunication network node 208 can also include additional data storage devices (removable and/or non-removable) such as, for example, magnetic disks, optical disks, or tape. Such additional storage is illustrated in FIG. 3 by removable storage 308 and non-removable storage 310. Non-transitory computer-readable media may include volatile and nonvolatile, removable and non-removable media implemented in any method or technology for storage of information, such as computer readable instructions, data structures, program modules, or other data. System memory 302, removable storage 308 and non-removable storage 310 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by the telecommunication network node 208. Any such computer-readable storage media can be part of the telecommunication network node 208. In various examples, any or all of system memory 302, removable storage 308, and non-removable storage 310, store programming instructions which, when executed, implement some or all of the above-described operations of the telecommunication network node 208.

In some examples, the telecommunication network node 208 can also have input device(s) 312, such as a keyboard, a mouse, a touch-sensitive display, voice input device, etc., and/or output device(s) 314 such as a display, speakers, a printer, etc. These devices are well known in the art and need not be discussed at length here.

The telecommunication network node 208 can also contain communication connections 316 that allow the telecommunication network node 208 to communicate with other network elements 318, such as other nodes of telecommunication network 102.

Example Operations

Figure 4:
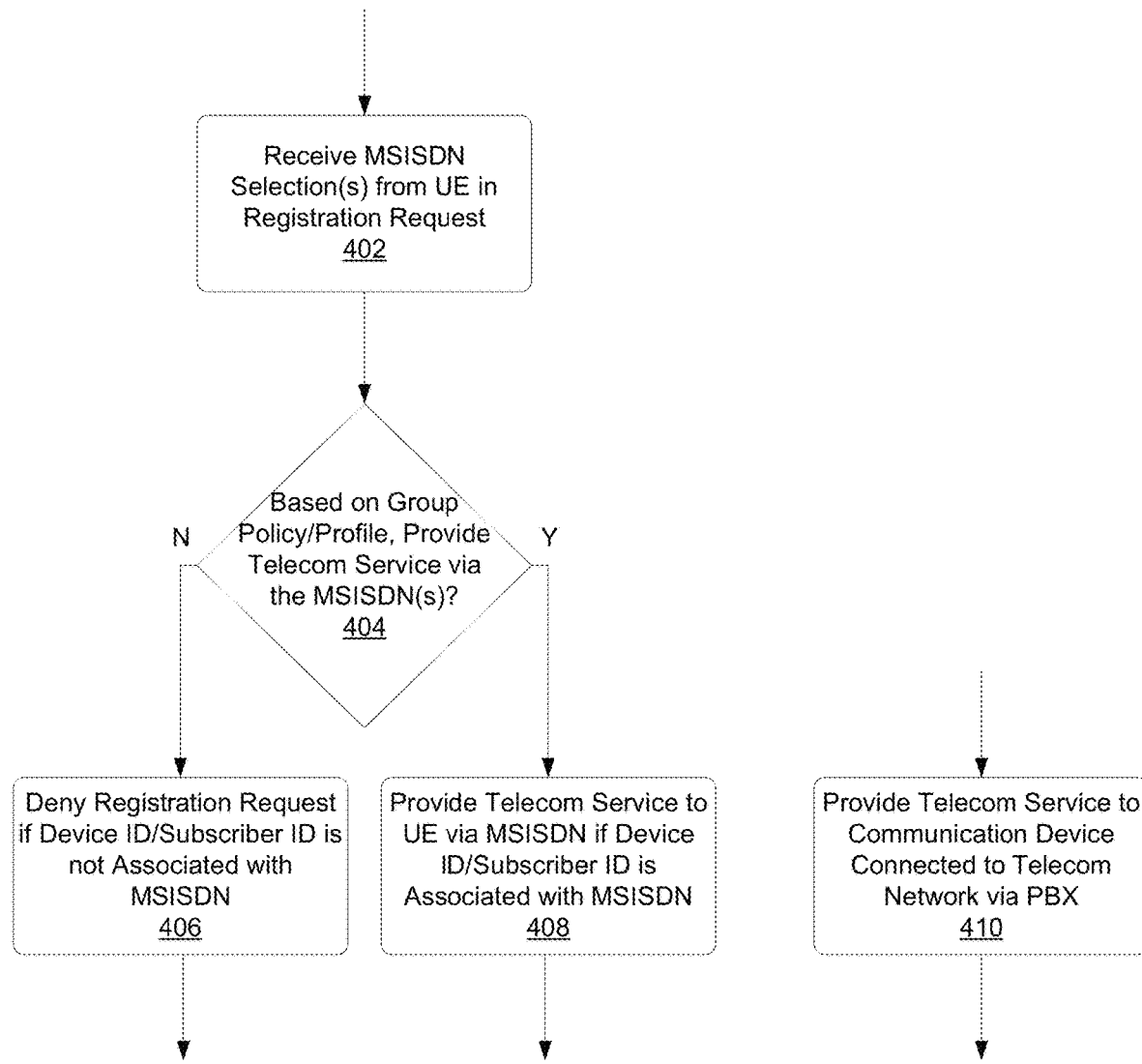
FIG. 4 illustrates a flow chart of an example process for a telecommunication network to provide telecommunication service to a UE and a communication device of a PBX, the UE and communication device sharing a MSISDN.
Figure 5:
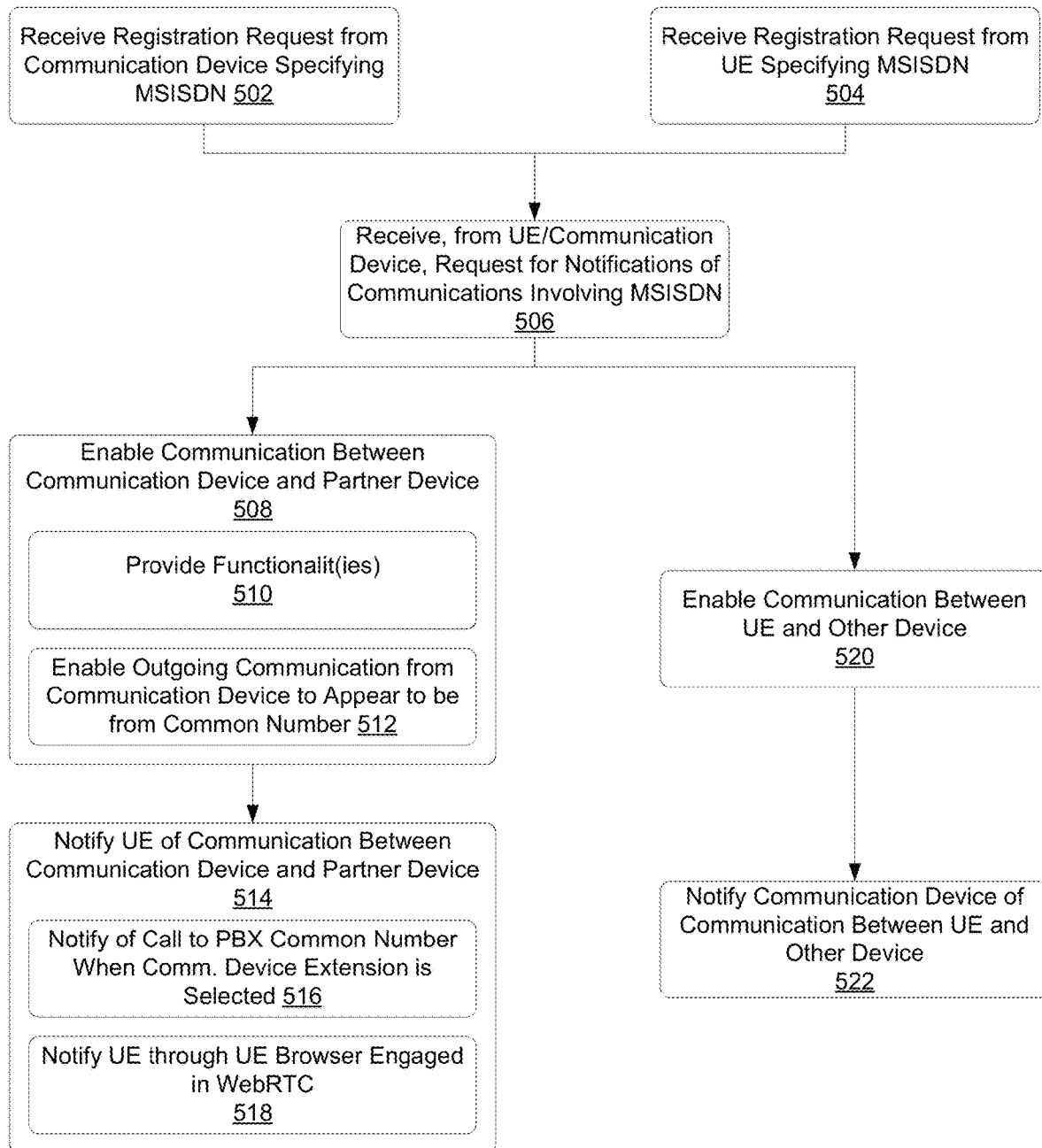
FIG. 5 illustrates a flow chart of an example process for a telecommunication network node of a telecommunication network to receive a registration request specifying a MSISDN from a communication device of a PBX, to enable communication with a communication partner, and to notify a UE of the communication, the UE being associated with the MSISDN in a profile stored by the telecommunication network.

FIGS. 4-5 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 illustrates a flow chart of an example process for a telecommunication network to provide telecommunication service to a UE and a communication device of a PBX, the UE and communication device sharing a MSISDN.

At block 402, the telecommunication network receives a selection of one or more MSISDNs from the plurality of MSISDNs from the UE to utilize for the telecommunication service. Such a selection may be specified in a registration request received from the UE.

At block 404, the telecommunication network determines, based on a group policy and/or a profile, whether to provide telecommunication service to the UE via the MSISDNs. For example, a group policy may specify a list of devices or subscribers allowed to use a MSISDN associated with a PBX of the group imposing the group policy.

If one of the selected MSISDNs is among those specified in the group policy, but the device identifier, UUID, or other subscriber info of the UE is not among those associated with that MSISDN, the telecommunication network may deny, at 406, the registration request.

If, on the other hand, the device identifier, UUID, or other subscriber info of the UE is associated with the MSISDN, the telecommunication network may, at 408, provide telecommunication service to the UE via the MSISDN.

In additional or alternative implementations, the telecommunication network may, at 408, provide telecommunication service to the UE via any of the MSISDNs associated with a device identifier, UUID, and/or subscriber identifier in a profile stored by the telecommunication network. In some implementations, providing the telecommunication service to the UE comprises providing the telecommunication service through a client application of the UE or through a web real-time communication (WebRTC) session of a browser of the UE.

At 410, the telecommunication network may provide telecommunication service to a communication device that is connected to the telecommunication network via a private branch exchange (PBX), and the communication device may utilize one of the MSISDNs associated with the UE or subscriber account for the telecommunication service. Such a PBX may be the PBX having the group policy. Providing the telecommunication service to the communication device, at 410, may occur prior to, during, and/or after providing telecommunication service to the UE at 408.

In some implementations, the profile storing the association between the subscriber identifier, UUID, and/or device identifier of the UE with the MSISDN may also store an associated between that same subscriber identifier, UUID, and/or MSISDN with a device identifier of the communication device, thus enabling the UE and communication device to share the MSISDN. The profile, or another profile, may also associate the MSISDN with another subscriber identifier, such as a subscriber identifier belonging to an entity associated with the PBX.

FIG. 5 illustrates a flow chart of an example process for a telecommunication network node of a telecommunication network to receive a registration request specifying a MSISDN from a communication device of a PBX, to enable communication with a communication partner, and to notify a UE of the communication, the UE being associated with the MSISDN in a profile stored by the telecommunication network.

At block 502, the telecommunication network node may receive, from a communication device that is connected to the telecommunication network via a PBX, a registration request specifying a MSISDN of the communication device. In some implementations, the telecommunication network node may be an IMS application server and the registration request may be a SIP registration request. The communication device may be one of a desk phone, a conference room phone, or video conference equipment At 504, either before, during, or after the receiving at 502, the telecommunication network node may receive a registration request from the UE. The registration request from the UE may specify the MSISDN of the communication device as the MSISDN of the UE.

At block 506, the telecommunication network node may receive, from the communication device and/or the UE, a request for notifications of communications involving the MSISDN. The UE and/or communication device may request notifications for each MSISDN they are associate with. The telecommunication network node may determine such associations by referencing a profile that associates each MSISDN with one or more device identifiers, one or more UUIDs, and/or one or more subscriber identifiers.

At 508, the telecommunication network node may enable a communication between the communication device and a communication partner device. At 510, the enabling may include providing auto attendant functionality, enabling line sharing, providing hunt group functionality, providing fax functionality, or providing extension calling functionality. At 512, the enabling may include enabling an outgoing communication from the communication device to the communication partner device to appear to be from the common number while originating from the MSISDN. The communication device may be associated with the common number, which may be shared by the communication device and other devices of the PBX, by a group policy stored by the telecommunication network. The common number may or may not be different from the MSISDN.

At 514, the telecommunication network node may notify the UE of the communication. At 516, the notifying may include notifying the UE of a call to common number associated with the PBX where an originating party selects an extension associated with the communication device. At 518, the notifying the UE may include notifying a computer through a browser of the computer engaged in a Web Real-Time Communication (WebRTC) session.

At 520, either before, concurrently with, or after the operations at 508-518, the telecommunication network node may enable a communication between the UE and another device.

At 522, the telecommunication network node may then notify the communication device of the communication between the UE and the other device.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A telecommunication network node of a telecommunication network, the telecommunication network node comprising:
    a processor; and
    programming instructions which, when executed by the processor, cause the telecommunication network node to perform operations including:
        receiving, from a communication device that is connected to the telecommunication network via a private branch exchange (PBX), a registration request specifying a Mobile Station International Subscriber Directory Number (MSISDN) of the communication device;
        enabling a communication between the communication device and a communication partner device;
        notifying a user equipment (UE) of the communication, the UE being associated with the MSISDN in a profile that associates the MSISDN at least with the communication device and the UE;
        receiving a registration request from the UE, the registration request from the UE specifying the MSISDN;
        enabling a communication between the UE and another device; and
        notifying the communication device of the communication between the UE and the other device.

2. The telecommunication network node of claim 1, wherein the enabling includes providing at least one of auto-attendant functionality, enabling line sharing, providing hunt group functionality, providing fax functionality, or providing extension calling functionality.

3. The telecommunication network node of claim 1, wherein the telecommunication network node is an Internet Protocol (IP) Multimedia Subsystem (IMS) application server and the registration request is a Session Initiation Protocol (SIP) registration request.

4. The telecommunication network node of claim 3, wherein the communication device is associated with a common number shared by the communication device and other devices of the PBX by a group policy stored by the telecommunication network, and the common number is different from the MSISDN.

5. The telecommunication network node of claim 4, wherein an outgoing communication from the communication device to the communication partner device appears to be from the common number while originating from the MSISDN.

6. The telecommunication network node of claim 1, wherein the operations further comprise receiving, from the communication device, a request for notifications of communications involving the MSISDN.

7. The telecommunication network node of claim 1, wherein the notifying includes notifying the UE of a call to common number associated with the PBX where an originating party selects an extension associated with the communication device.

8. The telecommunication network node of claim 1, wherein the MSISDN is a common number of the PBX associated with multiple devices of the PBX.

9. A non-transitory computer-readable medium having programming instructions stored thereon that, when executed by a processor of a telecommunication network node, cause the telecommunication network node to perform operations comprising:
receiving, from a communication device that is connected to the telecommunication network via a private branch exchange (PBX), a registration request specifying a Mobile Station International Subscriber Directory Number (MSISDN) of the communication device;
enabling a communication between the communication device and a communication partner device;
notifying a user equipment (UE) of the communication, the UE being associated with the MSISDN in a profile that associates the MSISDN at least with the communication device and the UE;
receiving a registration request from the UE, the registration request from the UE specifying the MSISDN;
enabling a communication between the UE and another device; and
notifying the communication device of the communication between the UE and the other device.

10. The non-transitory computer-readable medium of claim 9, wherein the communication device is one of a desk phone, a conference room phone, or video conference equipment.

11. The non-transitory computer-readable medium of claim 9, wherein the notifying the UE comprises notifying a computer through a browser of the computer engaged in a Web Real-Time Communication (WebRTC) session.

12. The non-transitory computer-readable medium of claim 9, wherein the operations further comprise receiving, from the UE, a registration request specifying the MSISDN.

13. A method comprising:
receiving by a telecommunication network node of a telecommunication network, from a communication device that is connected to the telecommunication network via a private branch exchange (PBX), a registration request specifying a Mobile Station International Subscriber Directory Number (MSISDN) of the communication device;
enabling, by the telecommunication network node, a communication between the communication device and a communication partner device;
notifying, by the telecommunication network node, a user equipment (UE) of the communication, the UE being associated with the MSISDN in a profile that associates the MSISDN at least with the communication device and the UE;
receiving, by the telecommunication network node, a registration request from the UE, the registration request from the UE specifying the MSISDN;
enabling, by the telecommunication network node, a communication between the UE and another device; and
notifying, by the telecommunication network node, the communication device of the communication between the UE and the other device.

14. The method of claim 13, wherein the enabling includes providing at least one of auto-attendant functionality, enabling line sharing, providing hunt group functionality, providing fax functionality, or providing extension calling functionality.

15. The method of claim 13, wherein the telecommunication network node is an Internet Protocol (IP) Multimedia Subsystem (IMS) application server and the registration request is a Session Initiation Protocol (SIP) registration request.

16. The method of claim 15, wherein the communication device is associated with a common number shared by the communication device and other devices of the PBX by a group policy stored by the telecommunication network, and the common number is different from the MSISDN.

17. The method of claim 16, wherein an outgoing communication from the communication device to the communication partner device appears to be from the common number while originating from the MSISDN.

18. The method of claim 13, further comprising receiving, from the communication device, a request for notifications of communications involving the MSISDN.

19. The method of claim 13, wherein the notifying includes notifying the UE of a call to common number associated with the PBX where an originating party selects an extension associated with the communication device.

20. The method of claim 13, wherein the MSISDN is a common number of the PBX associated with multiple devices of the PBX.

* * * * *